(12) United States Patent
Hoover

(10) Patent No.: US 6,959,811 B1
(45) Date of Patent: Nov. 1, 2005

(54) TACKLE CONTAINER WITH NESTING SPACE

(75) Inventor: Ronald D. Hoover, Baton Rouge, LA (US)

(73) Assignee: Paragon Plastics, Inc., Union, SC (US)

( * ) Notice: Subject to any disclaimer, the term of this patent is extended or adjusted under 35 U.S.C. 154(b) by 585 days.

(21) Appl. No.: 09/862,890

(22) Filed: May 22, 2001

(51) Int. Cl.⁷ .......................... B65D 25/06; A01K 97/06
(52) U.S. Cl. ................ 206/315.11; 43/54.1; 220/533
(58) Field of Search ............................. 43/54.1, 57.1, 43/57.2; 206/315.1, 315.11, 372, 373; 220/527, 220/532, 533, 529

(56) References Cited

U.S. PATENT DOCUMENTS

| | | | |
|---|---|---|---|
| RE10,598 E | | 5/1885 | Price |
| 2,220,817 A | * | 11/1940 | Holmes ...................... 43/57.1 |
| 2,364,807 A | * | 12/1944 | Nelson, Jr. ................. 43/57.1 |
| 2,610,430 A | | 9/1952 | Neiman |
| D174,914 S | | 6/1955 | McGee |
| 2,723,484 A | * | 11/1955 | Nelson, Jr. ................. 43/54.1 |
| 2,724,208 A | * | 11/1955 | Nelson ...................... 43/57.1 |
| 2,801,492 A | * | 5/1957 | Katwyk et al. ............. 43/57.1 |
| 2,846,806 A | * | 5/1958 | Gaines ...................... 43/57.1 |
| 2,991,581 A | * | 7/1961 | Fracassi .................... 43/57.1 |
| 3,493,102 A | * | 2/1970 | Belokin ...................... 312/215 |
| 3,758,977 A | | 9/1973 | Miller |
| 3,948,579 A | | 4/1976 | Schirmer |
| 4,261,464 A | * | 4/1981 | Maitland .................... 206/708 |
| 4,770,327 A | * | 9/1988 | Fortson ...................... 224/485 |
| 4,848,585 A | | 7/1989 | Snyder |
| 5,289,940 A | | 3/1994 | Wisenbaugh |
| 5,392,557 A | * | 2/1995 | Harmon et al. ............. 43/57.1 |
| 5,526,927 A | | 6/1996 | McLemore |
| 5,606,820 A | * | 3/1997 | Suddeth .................... 43/57.1 |
| 5,761,845 A | | 6/1998 | Bartholomew |
| 6,079,148 A | | 6/2000 | Yonenoi |
| 6,134,825 A | * | 10/2000 | Moffett et al. .............. 43/57.1 |
| 6,219,958 B1 | | 4/2001 | Eberts |

* cited by examiner

*Primary Examiner*—Jim Foster
(74) *Attorney, Agent, or Firm*—Summa & Allan, P.A.

(57) ABSTRACT

A container for the convenient transport and storage of fishing lures, particularly crank baits, is disclosed. The container includes channels running parallel to one another, with curved or slanted walls so that the bottom of the channel is offset from the top. A portion of each channel is therefore beneath a portion of the neighboring channel. This small area creates a nesting space for the treble hooks of the lures, with the weight of the lure tending to immobilize the hooks against the barrier, preventing them from tangling with each other, or other lures.

26 Claims, 5 Drawing Sheets

TACKLE CONTAINER WITH NESTING SPACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates, generally, to containers for the storage of fishing tackle.

2. Description of Related Art

Crank baits are a widely used fishing lure. This type of lure generally has an elongated body with two or more free-hanging treble hooks attached to its belly. Because of the free range of movement and the peculiar shape of the hooks, crank baits have a high propensity for tangling when stored in proximity to other baits. Many designs have been used in an attempt to solve the problem of storing crank baits effectively and efficiently, with varying degrees of success.

The simplest of these designs involves placing the crank baits in a container, intermingled. This method does not work well because the treble hooks tend to become entangled with each other. Extricating these tangles can be frustrating, and there is no protection from the hooks during the process. It may also be very difficult to separate a bait quietly, which may be an important consideration.

Another possibility that has been used is to compartmentalize the baits. There are several ways of accomplishing this. The most basic is to leave the bait in its original packaging for storage. This is not an efficient use of space, however, and the necessity of removing the bait from the package increases the time needed to prepare a line. Another way is to use of container with numerous individual compartments. This is undesirable because it is an inefficient use of space, and because the compartments must be sized in advance, making them suitable for only a small range of crank baits.

U.S. Pat. No. 5,392,557 discloses yet another method of storing crank baits. It employs V-shaped channels with a small crack running along the channels in the bottom. The channels are elevated slightly above the bottom to create a space underneath. By positioning the baits upright and sliding the baits into the channels with the hooks underneath, the possibility of tangles is removed. However, the large amount of space needed underneath to accommodate a range of hook sizes is largely wasted. Further, the design makes it a bit difficult to store and remove the baits, because the baits must be slid in and out of the channels.

What is needed is a crank bait storage container that can store numerous baits in a relatively small area, free from the possibility of tangles, without making it difficult to insert or remove the baits.

SUMMARY OF THE INVENTION

It is an object of the present invention to provide a tackle container capable of conveniently carrying numerous crank baits.

It is another object of the present invention to provide a tackle container that keeps the baits separated from one another, without making it difficult to insert or remove them from the container.

It is another object of the present invention to provide a tackle container that can store crank baits in a relatively small area.

These, and other objects of this invention will appear to one skilled in the art as the description thereof proceeds.

The novelty of this invention is a new and unique structure that makes the storage of crank baits simple, efficient, and practical. It consists of parallel channels within a box, with the lower portion of each channel being offset horizontally from the top portion. Part of each channel is thus beneath its neighboring channel, creating a nesting space.

When the crank baits are placed in a channel with the hooks facing down, the sloped walls guide the hooks into the nesting space. The body of the lure, resting on the slope above the hooks, pushes down on the hooks so as to keep them in place.

In the preferred embodiment of the invention, the channels are formed by inserts. Each insert has a wall at each end of the channel, with rails on the outside. The rails are designed to mate with slots on the interior sidewalls of the container. When mated on both sides, the inserts are held firmly in place, although they are easily removable simply by lifting straight up. The second insert to be added, and each additional one thereafter, creates a channel in the container.

DETAILED DESCRIPTION OF THE INVENTION

Figure 1:
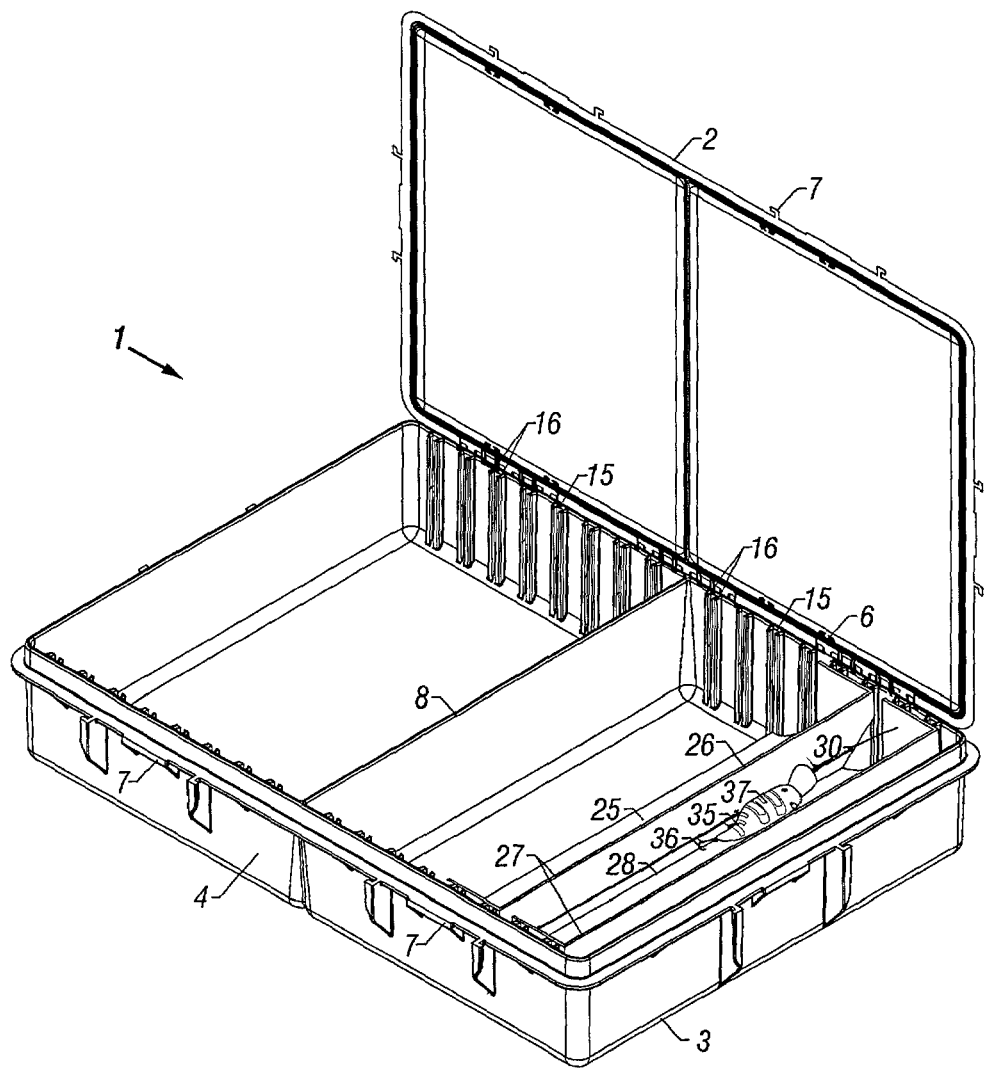
FIG. 1 is an isometric view of the invention.

FIG. 1 is a view of a preferred embodiment of the invention as it appears when fully assembled. Tackle container 1 is shown, with bottom 3, sidewall 4, and partition 8. Channel 25 is also shown, comprised of a pair of barriers 26. Fishing lure 35 is also shown, in proper storage position with hooks 36 adjacent to bottom 3 and urged into nesting space 28 beneath barrier 26.

Figure 2:
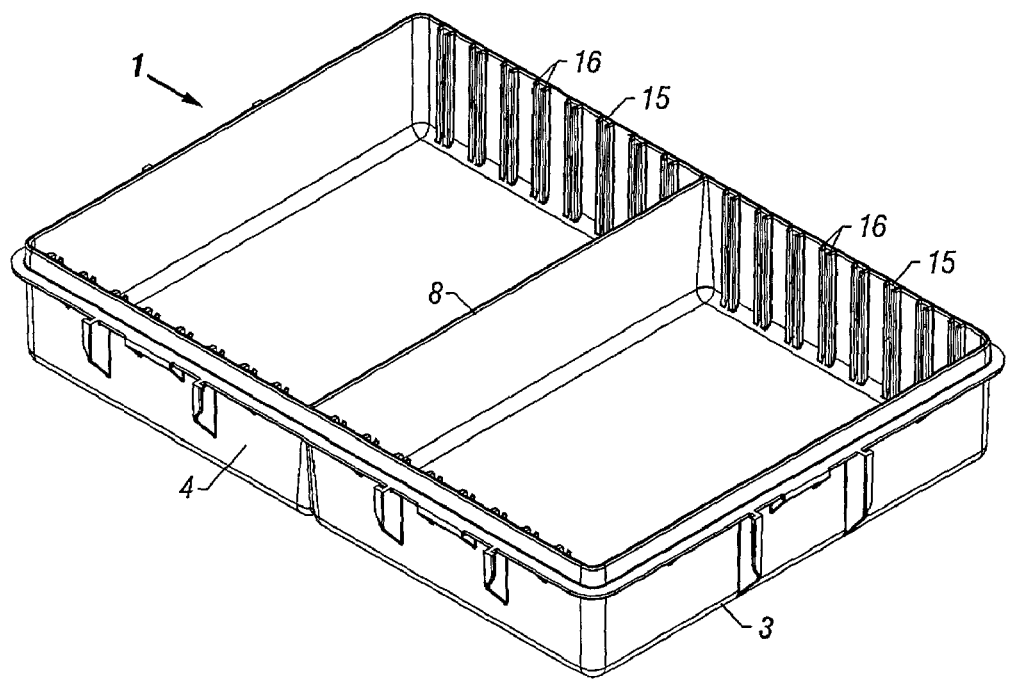
FIG. 2 is an isometric view of the invention without the inserts.

FIG. 2 shows tackle container 1 as it appears without inserts 29. Slots 15 are shown, oriented vertically on the interior of sidewall 4. The spacing of slots 15 is selected based on the size of fishing lure 35 and the number of connections desired between sidewall 4 and insert 29. Each slot 15 is made from two webs 16. Webs 16 preferably converge slightly from top to bottom, to make it easier to insert rails 17, shown in FIG. 3, into slots 15 and to provide a snug fit once rails 17 are inserted their full length.

Rails 17 have a trapezoidal cross section, widening as they protrude from end wall 30. Slots 15 have a corresponding shape. This prevents rails 17 from disengaging from slots 17 in any way other than by lifting straight up. Partition 8 divides tackle container 1 approximately in half to make the storage of multiple types of baits more convenient.

Figure 3:
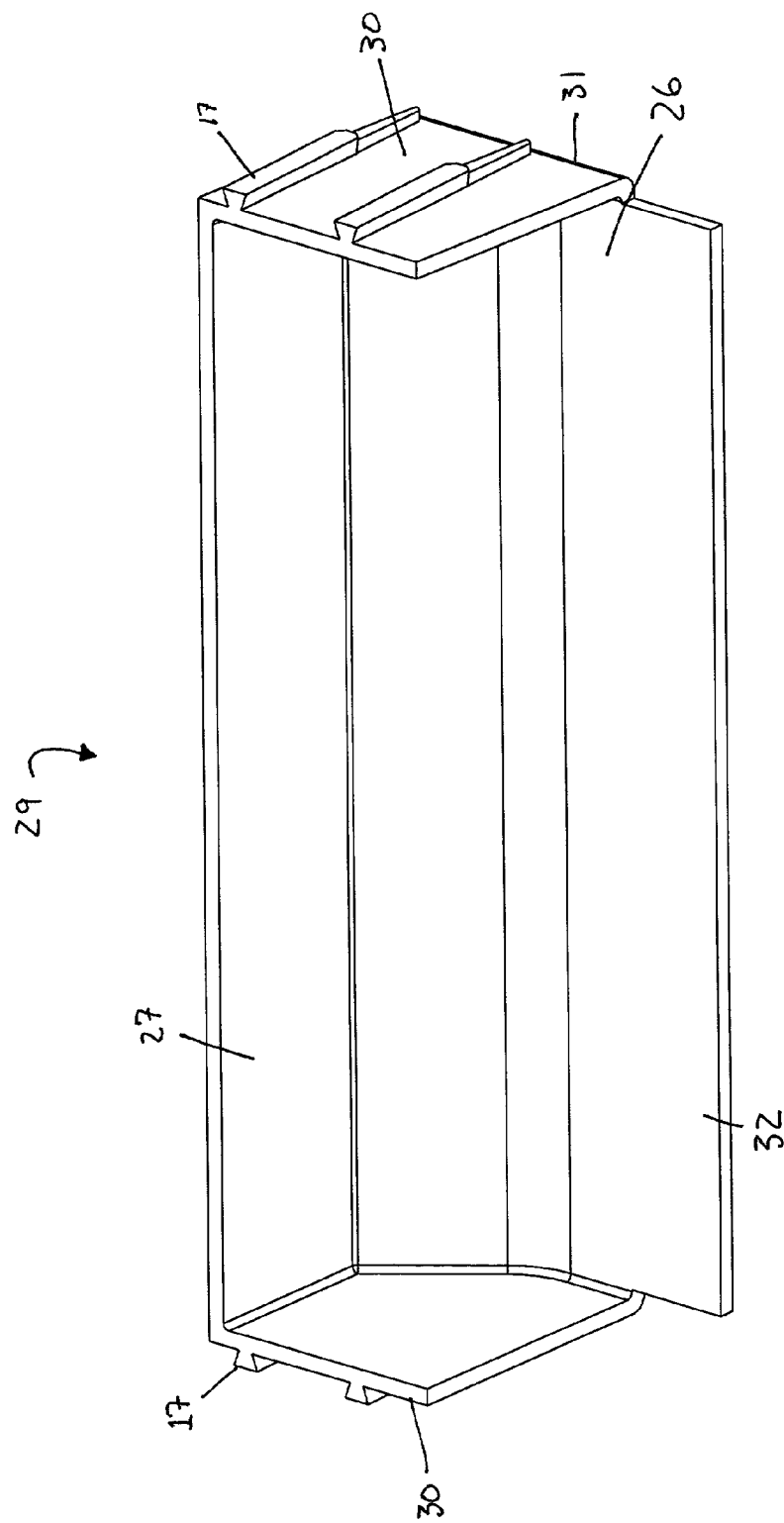
FIG. 3 is an isometric view of an insert.
Figure 4:
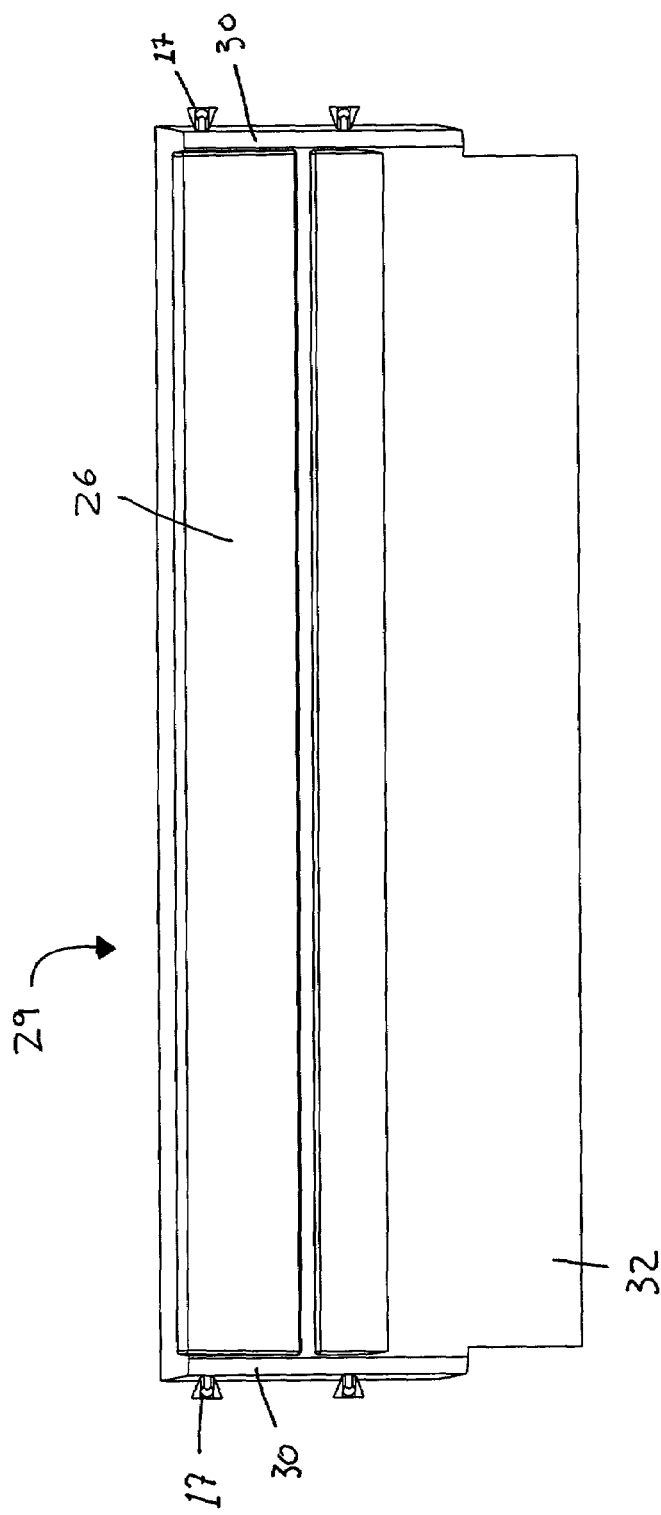
FIG. 4 is a top view of an insert.
Figure 5:
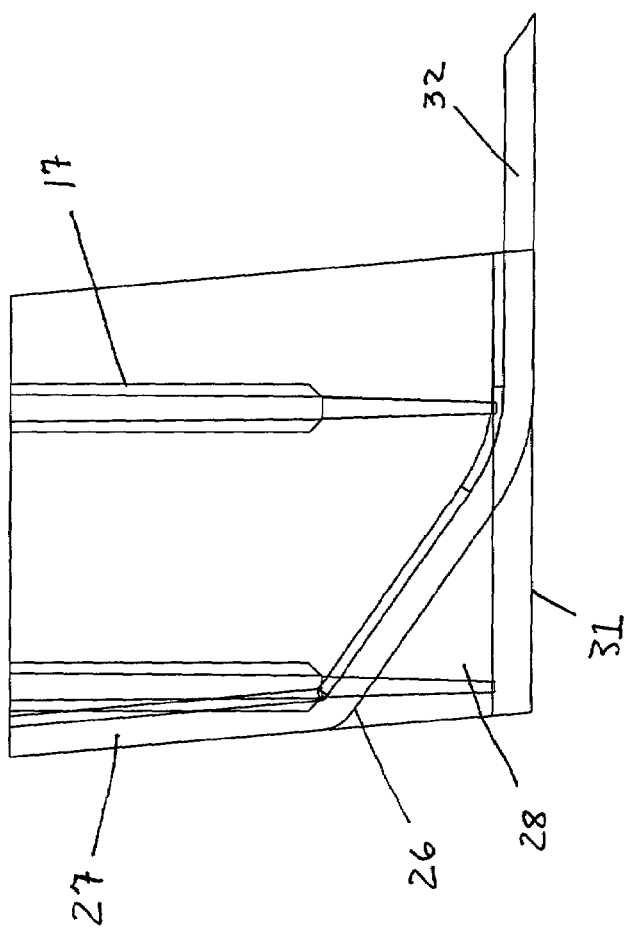
FIG. 5 is an end view of an insert.

FIGS. 3, 4, and 5, depicting insert 29, show the configuration of end walls 30 on insert 29. In addition to providing a connection for rails 17, end walls 30 increase the structural integrity of insert 29 as bottom edge 31 is flush with bottom 3 upon installation. This acts to prevent rotation about channel 25. End walls 30 are also important because barrier 26 is fixed between them.

Barrier 26 is a curved or segmented surface, essentially concave when viewed from above. It is not essential that barrier 26 be connected to end walls 30 along its entire edge. It is sufficient that the connection be secure. For instance, in the preferred embodiment, barrier 26 is connected to end walls 30 only at upper segment 27, where barrier 26 is nearly vertical. Lower segment 32, opposite upper segment 27, is not connected to end walls 30. Rather, it is merely connected to whatever intermediate segments are desired to attain the proper curvature. If a true curve were used for barrier 26, it could become similarly separated from end walls 30 at any point along the curve.

Two adjacent barriers 26 form channel 25. The lower portion of channel 25, where fishing lure 35 sits when properly inserted, is offset from the upper portion of channel 25, where fishing lure 35 first enters channel 25. The offset is the inevitable consequence of the curved nature of barrier 26, and it is what makes the invention so useful for the storage of crank baits.

In the preferred embodiment, barriers 26 all have the same shape. It necessarily follows that the separation between barriers 26, measured along a line traveling perpendicular to barriers 26 and parallel with bottom 3, is constant. Of course, it is not absolutely necessary that barriers 26 have this symmetry.

When inserting fishing lure 35 into tackle container 1, fishing lure 35 is first oriented so that hooks 36 are beneath body 37. Most crank baits, for which the present invention is most useful, have a pair of treble hooks attached to the belly of the bait. It may aid the insertion of lure 35 for the user to fold hooks 36 in toward each other and against body 37, but this orientation is not required for use of the device. Then, lure 35 is placed against barrier 26 and allowed to slide down toward bottom 3. Once hooks 36 have made contact with the next barrier 26, they should be pressed against barrier 26 and held in place by the weight of body 37. The area within channel 25 that is beneath barrier 26 is nesting space 28. The configuration of nesting space 28 provides a barricade for hooks 36 on all sides, including that provided by body 37. Therefore, hooks 36 cannot become entangled with other lures 35. Further, the motion of lure 35 is greatly restricted.

Although the drawings show channels 25 as formed from inserts 29, this is not mandatory. To practice the invention, all that is necessary is a channel 25 having nesting space 28.

There are of course other alternate embodiments that are obvious from the foregoing descriptions of the invention, which are intended to be included within the scope of the invention, as defined by the following claims.

I claim:

1. A tackle container for holding fishing lures, each said lure having a body and a plurality of hooks, said container comprising:
   a bottom;
   a continuous sidewall;
   at least two slots vertically oriented on said sidewall;
   at least two inserts each having an end wall, said end wall having a bottom edge, and a rail on the outside of said end wall, said rail adapted to slide vertically into one of said slots such that said bottom edge remains parallel with said bottom;
   wherein when said rails are inserted into said slots, at least one channel is formed having an upper portion and a lower portion, said channel comprised of two barriers, said lower portion offset from said upper portion;
   whereby when said rails are inserted into said slots, said inserts are held in place, and when said fishing lure is placed within said channel with said hooks facing said bottom, said hooks come to rest under one of said barriers with the weight of said body urging said hooks into said barrier.

2. The container of claim 1 further comprising:
   a second slot vertically oriented on said sidewall opposite one of said two slots;
   a second end wall on each insert opposite said end wall;
   a second rail on the outside of said second end wall, said second rail adapted to slide vertically into said second slot as said rail slides into said slot.

3. The container of claim 2, further comprising:
   a third slot on said sidewall, parallel to and adjacent to one of said two slots;
   a fourth slot on said sidewall, opposite said third slot, parallel to and adjacent said second slot;
   third and fourth rails on the outside of said end walls, adapted to slide vertically into said third and fourth slots, respectively, as said rail and said second rail slide into said slot and said second slot.

4. The container of claim 1, wherein said vertical slots are parallel and positioned alongside each other.

5. The container of claim 1, wherein said vertical slots are positioned on opposite portions of said sidewall.

6. The container of claim 1, wherein the barrier of each said insert comprises a substantially concave barrier, said barrier adjoining said end wall of said insert.

7. The container of claim 6, wherein said barrier comprises at least one segment.

8. The container of claim 6, wherein said barrier is curved.

9. The container of claim 1, wherein said channel comprises a nesting space in which said hooks rest.

10. A tackle container for holding fishing lures, each lure having a body and a plurality of hooks, the container comprising:
    a bottom;
    a continuous sidewall surrounding the perimeter of said bottom;
    a first slot and a second slot, said first and second slots vertically oriented on said sidewall;
    a first insert and a second insert, each said insert comprising a substantially concave barrier adjoining a first end wall, said first end wall comprising a vertical rail opposite said barrier;
    wherein said first insert's vertical rail slides into said first slot and said second insert's vertical rail slides into said second slot such that said first insert's barrier and said second insert's barrier define a channel there between, wherein the channel includes a nesting space.

11. The container of claim 10, wherein said vertical slots are parallel and positioned alongside each other.

12. The container of claim 10, wherein said vertical slots are positioned on opposite portions of said sidewall.

13. The container of claim 10, wherein each said barrier is segmented.

14. The container of claim 10, wherein each said barrier comprises a plurality of joined segments.

15. The container of claim 10, wherein each said barrier is curved.

16. The container of claim 10, comprising:
    a third slot vertically oriented on said sidewall opposite said first slot;

a second end wall on said first insert, said second end wall connected to said barrier of said first insert opposite said first end wall of said first insert;

a second rail on the outside of said second end wall of said first insert, said second rail adapted to slide vertically into said third slot as said first rail of said first insert slides into said first slot.

17. The container of claim 16, further comprising:

a fourth slot on said sidewall, parallel to and between said first and second slots;

a fifth slot on said sidewall, opposite said fourth slot, parallel to and adjacent said third slot;

a third rail on the outside of said first end wall of said first insert and a fourth rail on the outside of said second end wall of said first insert, said third rail adapted to slide vertically into said fourth slot, as said fourth rail slides vertically into said fifth slot.

18. The container of claim 17, further comprising:

a sixth slot vertically oriented on said sidewall opposite said second slot and adjacent and parallel to said third and fifth slots;

a second end wall on said second insert, said second end wall connected to said barrier of said second insert opposite said first end wall of said second insert;

a fifth rail on the outside of said second end wall of said second insert, said fifth rail adapted to slide vertically into said sixth slot as said first rail on said first end wall of said second insert slides into said second slot.

19. The container of claim 18, further comprising:

a seventh slot on said sidewall, parallel to and adjacent to said second slot;

an eighth slot on said sidewall, opposite said seventh slot, parallel to and adjacent said sixth slot;

a sixth rail on the outside of said first end wall of said second insert and a seventh rail on the outside of said second end wall of said second insert, said sixth rail adapted to slide vertically into said seventh slot, as said seventh rail slides vertically into said eighth slot.

20. The container of claim 14 further comprising a partition dividing the container into two portions.

21. A tackle container for holding fishing lures, each lure having a body and a plurality of hooks, the container comprising:

a bottom;

a continuous sidewall surrounding the perimeter of said bottom;

pairs of vertical slots positioned around said sidewall such that each pair of slots is aligned with another pair of slots on an opposite portion of said sidewall;

at least first and second inserts, each said insert comprising a substantially concave barrier extending between first and second end walls, said end walls each comprising a pair of vertical rails opposite said barrier;

wherein said pairs of rails on said end walls of each insert slide into pairs of slots on said sidewall such that said barriers define a channel between said barriers, wherein the lower portion of the channel is horizontally offset from the upper portion of the channel.

22. The container of claim 21, wherein said barriers converge along said bottom of the container to form a nesting space for holding the hooks of a lure within the lower portion of the channel.

23. The container of claim 21 further comprising a partition dividing the container into two portions.

24. The container of claim 21, wherein each said barrier is segmented.

25. The container of claim 21, wherein each said barrier comprises a plurality of joined segments.

26. The container of claim 21, wherein each said barrier is curved.

* * * * *